(12) United States Patent
Del Puerto Garcia

(10) Patent No.: US 9,641,608 B2
(45) Date of Patent: May 2, 2017

(54) NETWORK RELOCATION OF SOFTWARE FEATURES THROUGH DATA FLOW ANALYSIS

(71) Applicant: Marcos Del Puerto Garcia, Heidelberg (DE)

(72) Inventor: Marcos Del Puerto Garcia, Heidelberg (DE)

(73) Assignee: SAP SE, Walldorf (DE)

( * ) Notice: Subject to any disclaimer, the term of this patent is extended or adjusted under 35 U.S.C. 154(b) by 117 days.

(21) Appl. No.: 14/567,558

(22) Filed: Dec. 11, 2014

(65) Prior Publication Data

US 2016/0173588 A1 Jun. 16, 2016

(51) Int. Cl.
*H04L 29/06* (2006.01)
*H04L 29/08* (2006.01)
*G06F 3/0484* (2013.01)

(52) U.S. Cl.
CPC ...... *H04L 67/1091* (2013.01); *G06F 3/04842* (2013.01); *H04L 67/10* (2013.01); *H04L 67/34* (2013.01); *H04L 67/42* (2013.01)

(58) Field of Classification Search
CPC . G06F 9/4401; G06F 3/04842; H04L 67/1091
USPC ........ 709/203, 218; 717/127, 130, 136, 162, 717/168
See application file for complete search history.

(56) References Cited

U.S. PATENT DOCUMENTS

| | | | | |
|---|---|---|---|---|
| 6,694,370 B1 * | 2/2004 | Bischof | ................. | G06F 9/4868 709/229 |
| 8,881,122 B1 * | 11/2014 | Klimek | .................... | G06F 8/436 717/140 |
| 2006/0101430 A1 * | 5/2006 | Hayashi | .................. | G06F 8/423 717/137 |
| 2014/0280486 A1 * | 9/2014 | Seay | ....................... | H04L 67/02 709/203 |

OTHER PUBLICATIONS

"A Framework for Relocation in Mobile Process-Centered Software Development Environments"—Bhattacharyya et al, University of Massachusetts. Math., vol. 1, No. 2, Aug. 2004 http://laser.cs.umass.edu/techreports/96-69.pdf.*

* cited by examiner

*Primary Examiner* — Randy Scott
(74) *Attorney, Agent, or Firm* — Brake Hughes Bellermann LLP

(57) ABSTRACT

A feature selection of a feature of an application may be received, where the application is designed for partial execution on a server and for partial execution on a client computer connected to the server by a network. A current location of application code implementing the feature may be identified as being at either the server or the client computer. Then, implementation of the feature may be relocated from the current location to a modified location, where modified application code, obtained from the application code, is re-assigned between the server and the client computer.

18 Claims, 6 Drawing Sheets

NETWORK RELOCATION OF SOFTWARE FEATURES THROUGH DATA FLOW ANALYSIS

TECHNICAL FIELD

This description relates to network-based software.

BACKGROUND

Many computer applications are executed over a network, e.g., using a server within the network to execute some features of the application, while using a client to execute other features of the application. Some such applications are referred to as 'cloud-based' applications, because the experience of a user at the client computer is that the client-side application features are executed locally, while server-side features are executed remotely at a network location(s) that is not, as far as the user is concerned, defined with any degree of particularity. In other words, the user may be aware that certain features are provided remotely, but the user need not (or should not) generally be required to know details regarding server-side implementation details. Instead, the user is simply provided with application features that are implemented 'in the cloud,' so that the overall user experience is enhanced. Meanwhile, a provider or administrator of the network or cloud-based application, i.e., at the server-side, may be provided with greater control, lower costs, enhanced security, enhanced reliability, and other potential benefits.

In practice, such network applications may be quite large, e.g., in terms of a quantity of data being managed, or in terms of lines of code used to implement the network application(s). Consequently, the design and deployment of such network applications may be difficult to implement in a desired (e.g., cost-effective, secure, and reliable) manner. As a result, particularly following an actual deployment of such network applications, providers, administrators, or users may not be fully satisfied with a performance of the network application. In such cases, changes to the network application may be required. However, in many such cases, attempted changes may be error-prone or ineffective, and may require multiple costly and time-consuming efforts to obtain a desired result(s).

SUMMARY

According to one general aspect, a computer program product may be tangibly embodied on a non-transitory computer-readable storage medium and may include instructions. The instructions, when executed by at least one processor, may be configured to receive a feature selection of a feature of an application, the application designed for partial execution on a server and for partial execution on a client computer connected to the server by a network. The instructions, when executed by the at least one processor, may be further configured to identify a current location of application code implementing the feature as being at either the server or the client computer, and relocate implementation of the feature from the current location to a modified location including re-assigning modified application code, obtained from the application code, between the server and the client computer.

According to another general aspect, a computer-implemented method for executing instructions stored on a non-transitory computer readable storage medium may include receiving a feature selection of a feature of an application, the application designed for partial execution on a server and for partial execution on a client computer connected to the server by a network, and identifying a current location of application code implementing the feature as being at either the server or the client computer. The method may further include identifying communication points of the application code, from within an entire application code of the application, at which client-server interactions occur, and extracting the application code, based on the communication points. The method may further include modifying the application code to obtain modified application code, and relocating implementation of the feature from the current location to a modified location including re-assigning the modified application code between the server and the client computer.

According to another general aspect, a system may include instructions recorded on a non-transitory computer-readable storage medium, and executable by at least one processor. The system may include a feature selector configured to cause the at least one processor to receive a feature selection of a feature of an application, the application designed for partial execution on a server and for partial execution on a client computer connected to the server by a network, and a feature analyzer configured to cause the at least one processor to identify a current location of application code implementing the feature as being at either the server or the client computer, and identify the application code from within an entire application code of the application. The system may include a logic extractor configured to extract the application code from the entire application code, and a code relocator configured to modify the extracted application code to obtain modified application code in which server-client interactions are reversed as compared to in the extracted application code, and relocate implementation of the feature including re-assigning the modified application code between the server and the client computer.

The details of one or more implementations are set forth in the accompanying drawings and the description below. Other features will be apparent from the description and drawings, and from the claims.

DETAILED DESCRIPTION

Figure 1:
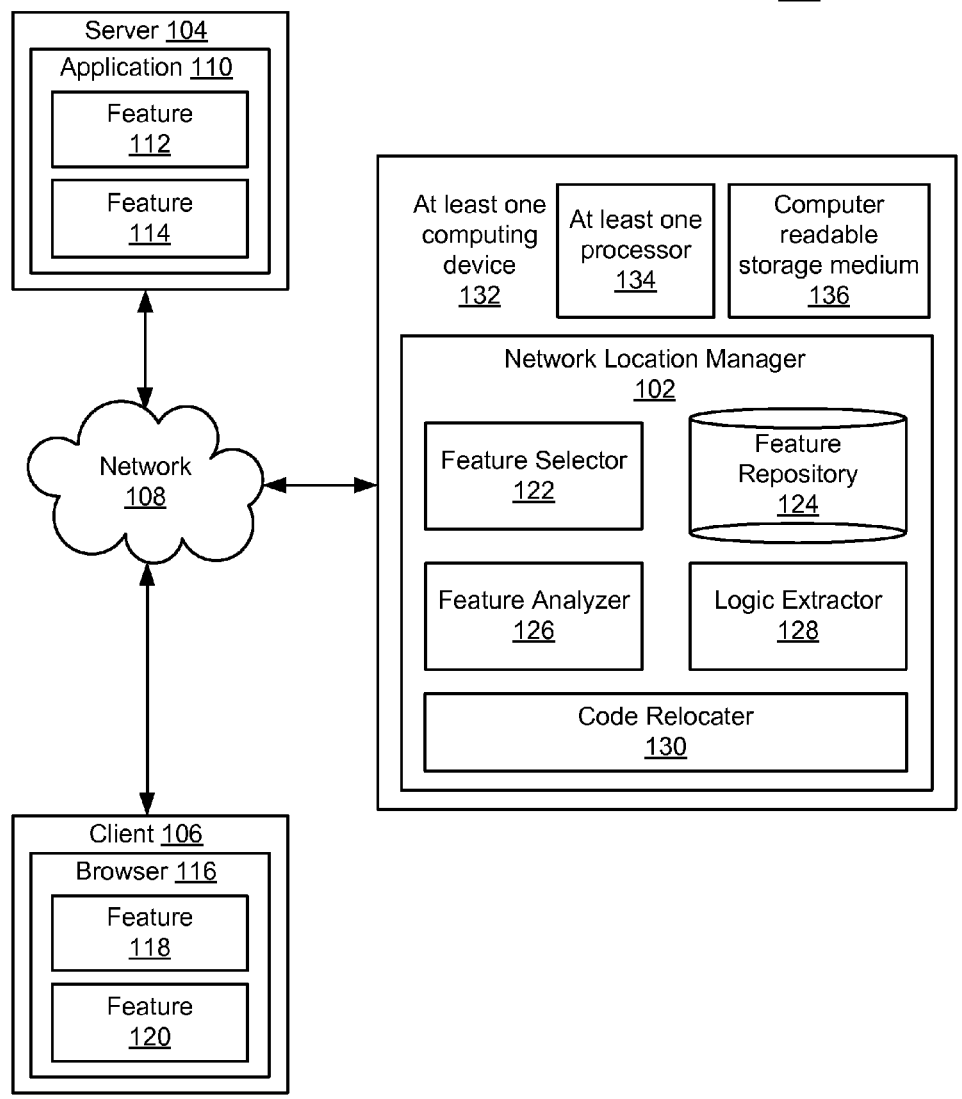
FIG. 1 is a block diagram of a system for network relocation of software features through data flow analysis.

FIG. 1 is a block diagram of a system 100 for network relocation of software features through data flow analysis. In the example of FIG. 1, a network location manager 102 is configured to manage certain operations of a server 104 and a client 106, connected by way of a computer network 108. More specifically, as described in detail herein, the network location manager 102 may be configured to modify operations of a network application 110 that is executed using both the server 104 and the client 106, in order to optimize operations of the network application 100.

In particular, as shown by way of simplified example, the network application 110 is illustrated as including feature 112 and feature 114 at the server 104, while a browser application 116 at the client 106 is illustrated as executing feature 118 and feature 120 of the network application 110. By managing a potential relocation of a client-based application feature (e.g., the feature 118 and/or the feature 120) from the client 106 to the server 104, or, conversely, by managing a relocation of a server-based feature (e.g., the feature 112 and/or the feature 114) to the client 106, the network location manager 102 enhances or otherwise optimizes overall operations of the network application 110, to the benefit of a provider of the network application 110 and/or a user of the client 106.

In the example of FIG. 1 and for purposes of the below discussion (unless stated otherwise), it is assumed that the network location manager 102 is provided by a vendor of the network application 110, for purposes of providing support for operations of the network application 110. For example, a vendor (not explicitly illustrated in the example of FIG. 1) may sell the network application 110 to an owner or other user of the server 104, who thus acts as a provider of the network application 110 to a user of the client 106. In many cases, the vendor may extend considerable resources in designing, implementing, and deploying the network application 110, and thereafter may be obligated or otherwise committed to providing customer service with respect to ongoing operations of the network application 110. In these and related scenarios, the owner or other user of the server 104 acts as a purchaser or customer of the vendor providing the network location manager 102 and the application 110, and relies upon the vendor to provide the application 110 in a satisfactory manner.

Thus, in example scenarios, the vendor providing the network location manager 102 and the network application 110 may design and develop the network application 110, including an initial assignment of the various features thereof to either the server 104 or the client 106. Specifically, as shown in the simplified example of FIG. 1, the vendor may initially design the features 112, 114 as server-side features of the network application 110, while designing features 118, 120 as client-side features of the network application 110. Of course, in typical scenarios, as referenced above, the network application 110 may be quite lengthy and complex, and may include a large number of application features (and associated, underlying application code). Consequently, it may be difficult for a designer of the network application 110 to determine optimal placement scenarios for each such feature. Moreover, even if the designer is able to design optimal feature placement for an initial deployment of the application 110, it may occur that circumstances of the deployment change over time (e.g., the application 110 may require enhanced security measures, or may be subject to greater than anticipated usage loads).

As a result, at a given point in time, it may be determined (e.g., by an owner or other user of the server 104 who is providing the application 110 to the client 106) that the application 110 is operating in a suboptimal or undesired fashion. At such time, the vendor providing the network location manager 102 may desire, or be required, to correct such suboptimal or undesired operations of the application 110, including relocating application features, as needed, from the server 104 to the client 106, or vice versa.

Although it is possible to implement such feature relocation in a manual fashion, such manual corrections are typically error-prone and time-consuming, and otherwise inefficient or ineffective. For example, support personnel of the vendor who attempt to provide such optimizations manually may be required to inspect large and lengthy code portions of the program code underlying the application 110. Even assuming that, with sufficient time, such support personnel may locate all application features that would be benefit from being relocated, the support personnel must thereafter actually execute associated, required code modifications to implement such code relocation. Again, such efforts are unlikely to satisfy quality and timeliness requirements of the owner or other user of the server 104 providing the application 110, and/or represent a poor use of manual resources of the vendor, while risking an associated loss of customer satisfaction for the vendor.

The network location manager 102, on the other hand, is capable of optimizing operations of the application 110 by relocating one or more identified application features between the client 106 and the server 104, in an automated, thorough, and accurate manner, without requiring large quantities of human resources to do so. In this way, the network application 110 may be optimized in a desired manner, even after a full deployment of the network application 110, and even in scenarios in which the application 110 is extremely large.

For purposes of the present description, the network application 110 should be understood to represent virtually any potential network application that may be implemented in the type of cloud-based scenario represented within the system 100 of FIG. 1. Thus, the network application 110 also may be referred to as a cloud-based application, cloud application, or simply an application or other appropriate nomenclature. By way of non-limiting example, the application 110 may represent a business application, such as a customer relationship management (CRM) application, a supply chain management (SCM) application, an enterprise resource planning (ERP) application, or any human resources, inventory management, or financial planning application. In other example implementations, the application 110 may represent virtually any web-based, e-commerce web application that is directed to a general or specific target of audience of potential consumers. For example, the application 110 in such scenarios may represent virtually any auction or retail-based e-commerce application.

Given the scope of potential applications represented by the application 110, the network 108 should similarly be understood to be representative of virtually any computer network used to implement the application 110 using (at least) both of the server 104 and the client 106. For example, the network 108 may represent the public internet, while, in additional or alternative examples, the network 108 may represent a virtual or physical private network, such as an intranet of a company or other enterprise that has deployed the application 110 for use by its employees with access to the company intranet.

Similarly, each of the features 112, 114, 118, 120 should generally be understood to represent virtually any discrete function, aspect, or characteristic of the application 110. As such, a given feature may be highly specific or particular to the application 110, while other features (e.g., password authentication features, or features related to confirmation of an online financial transaction, or features related to receiving and executing a query against one or more databases) may apply to a wide range of applications and application types.

As referenced above, during a time following a deployment of the application 110 within the system 100, based on a design thereof as implemented by the associated vendor, it may occur that an owner or other user of the server 104 who is providing the application 110 to the client 106, may determine that the application 110 is not performing in a sufficiently satisfactory manner. Examples of such scenarios include, for example, cases in which the server 104 is experiencing an unexpected or unacceptably high processing load associated with the application 110. In other examples, it may occur that the server 104 is provided to a user by way of a hosting service, in which case it may occur that the provider of the application 110 determines that hosting fees paid for use of the server 104 are unacceptably high. In still other examples, it may occur that the application 110 has been associated with a potential or actual security breach. For example, as described in detail below with respect to FIGS. 4A and 4B, for an existing configuration of the application 110, user passwords may be determined to be unacceptably susceptible to interception and/or possession by unauthorized users. In other scenarios, other types of sensitive or confidential data (e.g., financial information, or personal/private information) may be determined to be susceptible. In all such scenarios, as described herein, continued providing of the application 110 to the client 106 by an owner or other user of the server 104 may become unacceptable or unworkable.

In order to address these and other potential difficulties, the network location manager 102 may proceed to relocate individual features between the server 104 and the client 106, in order to enhance operations of the application 110 in a manner that addresses associated ones of the types of operational concerns that an owner or other user of the server 104 may have with respect to the providing of the application 110. As described above, the network location manager 102 may be utilized by an employee or other representative of the vendor that, in the examples, provided the application 110. Of course, in other example implementations, operation of the network location manager 102 may be implemented by the owner or other user of the server 104, or other suitable and authorized personnel.

Aside from the issue of which entity or personnel is responsible for operating the network location manager 102, FIG. 1 illustrates example elements of implementations of the network location manager 102 which are configured to provide the above-described functionalities, and related functionalities. For example, in FIG. 1, the network location manager 102 is illustrated as including a feature selector 122. As described in detail below, the feature selector 122 provides a human or automated user of the network location manager 102 with an ability to identify, in a general and/or specific manner, features or types of features that may be required to be relocated between the client 106 and the server 104.

For example, as described above, an owner or other user of the server 104 providing the application 110 may experience particular difficulties associated with the network-based implementation of the application 110, or may simply desire to execute configuration changes with respect to the way that the application 110 is deployed. In such cases, a user operating the network location manager 102 may interact with a user interface, e.g., a graphical user interface (GUI) provided by the feature selector 122, which provides the user with an ability to select from among a plurality of features that may be associated with a type of feature relocation operation described herein.

In more specific example implementations, the user of the network location manager 102 may be provided with a drop-down list of features or types of features that the user may wish to relocate. For example, such a drop-down list or other selection mechanism of a GUI may be populated with relatively high-level, general feature categories, such as those related to the types of operational difficulties referenced above, and the user may select from among these feature categories accordingly. In additional or alternative examples, the feature selector 122 may provide specific features for relocation. In still other examples, the feature selector 122 may provide a first level of feature selection in which feature categories are provided, and a subsequent level of feature selection in which more specific features within the selected feature category are presented.

In many cases, the types of features and feature categories may be generally applicable to a large number of different applications and types of applications. For example, a password or other authentication procedure may be a feature of a number of different applications. In this sense, the feature selector 122 may be implemented in a manner that is generic with respect to all such applications.

In additional or alternative examples, the feature selector 122 may be optimized for operation in conjunction with a specific application or type of application. For example, the feature selector 122 may provide selection from among individual features that are unique to the application 110.

To provide support for these various operations of the feature selector 122 as just described, a feature repository 124 may be included in the network location manager 102 that provides further details regarding operational aspects of the application 110 and/or related applications. For example, as just referenced, the feature repository 124 may specify a number of application features that are unique to the application 110, and that may be included by the feature selector 122 when receiving selections from a user of the network location manager 102 with respect to the application 110. At the same time, the feature repository 124 may include other features that are not relevant for the application 110, but that would be presented in conjunction with potential feature relocations executed by the network location manager 102 with respect to a separate application (not explicitly illustrated in the example of FIG. 1).

Further, the feature repository 124 may include technical details regarding the way the various features or feature categories are implemented, including specific details regarding a manner in which the server 104 and the client 106 are connected over the network 108, and/or specific technical details regarding the manner in which the various features 112, 114, 118, 120 are executed. For example, the feature repository 124 may include details regarding a connection of the server 104 with the browser 116 of the client 106. The feature repository 124 may specify, for example, whether and how the application 110 uses specific formats, protocols, or other techniques during server/client interactions, including, e.g., the use of java script object notation (JSON), hypertext transfer protocol (HTTP) forms, or various other well-known technologies for implementing network-based applications.

Once a selection of a particular feature is received by the feature selector 122, a feature analyzer 126 may receive the selected feature, and may proceed to identify a location of the selected feature within application code of the application 110. For the sake of providing a simplified example for the purposes of explaining operations of the system 100 of FIG. 1, and with the understanding that more detailed example operations are described below, it is assumed for the following discussion that a user of the network location manager 102 has determined that the feature 112 should be considered for relocation from the server 104 to the browser 116 to the client 106. For example, it may have been determined that the feature 112 is a computationally-intensive feature that is consuming too many computational resources of the server 104 when executed in the aggregate for a number of clients, including the client 106. Consequently, it may be determined that relocating the feature 112 from the server 104 to each of the various individual clients utilizing the application 110 (including the client 106) would distribute this computational load and leverage computational resources of the various clients.

Nonetheless, the mere identification and selection of the feature 112 using the feature selector 122 does not, by itself, define actual locations of associated code portions within the application code of the application 110. For example, the feature analyzer 126 may be configured to automatically recognize beginning/end points of application code relating to a selected feature 112, including scenarios in which code related to the feature 112 is located within two or more sections of the code of the application 110.

In executing such analysis of the selected feature 112 to correlate the selected feature 112 with associated, underlying code portions of the code of the application 110, the feature analyzer 126 may use various types of dataflow analysis to identify specific communication points or communication gateways that are executed by the application 110 in implementing exchanges of messages or other information between the server 104 and the client 106 over the network 108. In other words, for example, the feature analyzer 126 may execute such a dataflow analysis to identify all exchange points within the application code of the application 110 at which communication related to the feature 112 and executed between the server 104 and the client 106 over the network 108 occur.

More specific examples of such communication points or communication gateways are described in detail below. For purposes of understanding operations of the system 100 of FIG. 1, it will be appreciated that the feature analyzer 126 is configured to identify locations within the application code at which data changes domains between a domain of the server 104 and a domain of the client 106. Moreover, the feature analyzer 126 may identify such access points based on a type of technology being used to implement the application 110. For example, for a web browser, represented by the browser 116, a web socket or a hypertext markup language (HTML) header may be recognized, while, for a desktop application, a desktop application socket may be recognized.

In example implementations, the dataflow analysis performed may be a reverse dataflow analysis, in which the application code is considered starting from an identified access point, after which an associated operation using the identified access point is identified, so that it is known with certainty which portions of the application code will be affected by the potential relocation of the selected feature 112. In yet a further detailed example, a reverse abstract syntax tree (AST) of the affected code may be constructed. As described in more detail below, such a reverse AST provides a logical representation or abstraction of at least the affected code portions, so that the feature analyzer 126 is further enabled to identify and characterize such affected code portions in a complete and accurate manner.

Once the affected application code associated with the selected feature 112 has been identified within the application code of the application 110, a logic extractor 128 may be configured to remove the identified, affected code portions, and, where necessary or feasible, reconnect or otherwise configure remaining portions of the application code. For example, during a code extraction of the feature 112, it may occur that the remaining feature 114 at the server 104 expects certain communications with code portions associated with the feature 112 that will be modified as a result of the relocation of the feature 112 to the client 106. In such cases, the logic extractor 128 may be responsible for modifying portions of application code associated with the feature 114 to account for such differences and generally to perform successful code extraction of the code associated with the feature 112.

Once the code associated with the feature 112 has been successfully extracted, a code relocator 130 may be configured to modify the extracted code for successful execution thereof at its new network location (e.g., at the browser 116 in the case of the relocation of the feature 112). In general, such modifications of the extracted code portion will include implementing mirror image modifications thereof, in order to reflect the fact that communications which previously flowed from the server 104 to the client 106 will now flow from the client 106 to the server 104, and, conversely, communications which previously flowed from the client 106 to the server 104, will now flow from the server 104 to the client 106. In other words, for example, the modifications may include reversing server-client interactions of the application code.

In addition to making the types of mirror image representations of communication flows, the code relocator 130 may be configured to modify the extracted code portion to reflect the fact that different technologies may be in use at the anticipated new location for the affected code. For example, in cases where the feature 112 is related to password encryption techniques, it may occur that different encryption techniques are available at the server 104, as compared to those available at the client 106.

In example implementations, described in more detail below, the code relocator 130 may utilize a reverse abstract syntax tree (AST), as referenced above. That is, in some example implementations, the feature analyzer 126 may construct and utilize such a reverse AST for performing the types of feature analysis described above, and may thereafter provide the constructed reverse AST to the code relocator 130 for use by the code relocator 130 in modifying the extracted code. In other implementations, in which a reverse AST is not required or utilized at the feature analyzer 126, the code relocator 130 may itself construct a suitable reverse abstract syntax tree for purposes of representing the extracted code in an manner that is amenable to the types of code modification just described.

In further example implementations, code refactoring may be used in conjunction with the reverse AST as a specific technique for altering a type, order, implementation, name, or other aspect of the extracted code being relocated. In general, code refactoring refers to a process for restructuring existing computer code, without also altering an external behavior of the computer code. It will be appreciated from the following description that refactoring operations of the code relocator 130 are defined as being specific to the types of code relocations described herein, including the types of mirror image changes and changes based on the target platform of the relocated code, as referenced above.

It will be appreciated that, inasmuch as the extracted code being relocated interacts with other code portions associated with other features of the application 110, the code relocator 130 may also be required to perform similar or related modifications to such secondarily-affected code portions. That is, for example, the code relocator 130, after transmitting the application code associated with the feature 112 from the server 104 to the client 106, may determine that the feature 118 at the browser 116 will now interact differently with the application code of the feature 112, as compared to interactions that occurred before the relocation. In such cases, the code relocator 130 may be configured to modify code associated with the feature 118, as needed to ensure a continuing operation of the application 110 as a whole. In other cases, it may occur that the feature 112 interacts exactly the same with the feature 118, regardless of a location of the feature 112 at the server 104 or at the browser 116, so that the feature 118 is not required to be modified at all in the context of the example code relocation.

Therefore, in general, it will be appreciated that the code relocator 130 is configured to modify extracted code associated with, e.g., the feature 112, execute an actual transmission of the modified, extracted code to the updated, modified network location (e.g., the browser 116), and make any further modifications, if necessary, to secondarily-affected code portions of the application 110. In this regard, it may be appreciated that certain operations of the code relocator 130 may functionally overlap with operations of the logic extractor 128, so that the logic extractor 128 may be considered, in some implementations, to be executed as part of the code relocator 130.

More generally, it will be appreciated that any two or more elements of the network location manager 102 may be combined for execution of a single module, while, conversely, any single element of the network location manager 102 may be modified for execution as two or more separate sub-elements in communication with one another. Moreover, the network location manager 102 is illustrated as being executed using at least one computing device 132, which is illustrated as including at least one processor 134 and a non-transitory computer readable storage medium 136. In other words, for example, the at least one computing device 132 should be understood to represent two or more computing devices in communication with one another, so that, for example, in some implementations, elements of the network location manager 102 may be executed on one such computing device, while other elements of the network location manager 102 may be implemented in a second computing device, where the two or more computing devices may be in communication with one another by way of the network 108, or other appropriate communication technique.

Similarly, the at least one processor 134 may represent two or more processors operating in parallel to execute the network location manager 102 in an efficient manner, while the non-transitory computer readable storage medium 136 should be understood to represent one or more storage media for storing instructions which, when executed by the at least one processor 134, provide the various functionalities and aspects of the network location manager 102 described herein.

Of course, the representation of the at least one computing device 132 is a highly simplified abstraction of the type of computing device that may be utilized to implement the network location manager 102, in various other hardware and software aspects of such computing device will be readily understood to be implemented in conjunction with the network location manager 102. For example, suitable human input/output devices, including an appropriate display for providing a graphical user interface for interacting with the feature selector 122 may be provided. More generally, the at least one computing device 132 should be understood to represent virtually any desktop, laptop, notebook, netbook, tablet, mobile device, or any suitable computing device and associated peripherals for executing the network location manager 102. For example, in some implementations, the network location manager 102 may be implemented at the server 104, or at the client 106, assuming that a user thereof has required authorization and ability to implement the various features and functions of the network location manager 102 described herein.

Figure 2:
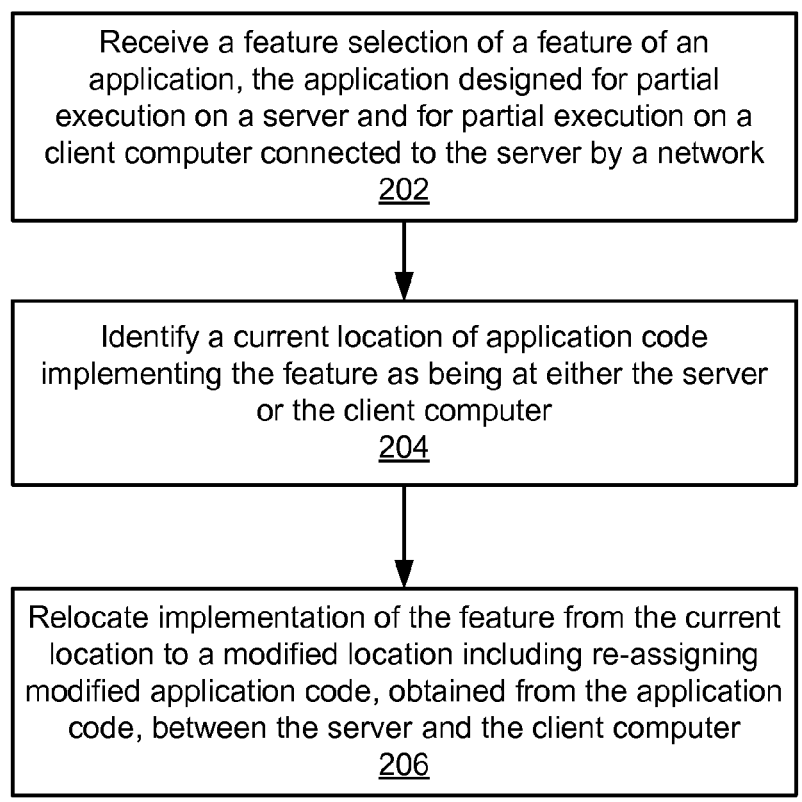
FIG. 2 is a flowchart illustrating example operations of the system of FIG. 1.

FIG. 2 is a flowchart 200 illustrating example operations of the system 100 of FIG. 1. In the example of FIG. 2, operations 202, 204, 206 are illustrated as separate, sequential operations. However, in additional or alternative implementations, various additional operations or sub-operations may be included, while one or more operations of FIG. 2, or portions thereof, may be omitted. In all such implementations, any two or more of the included operations or sub-operations may be executed in a partially or completely overlapping or parallel manner, or in a nested, iterative, branched, or looped manner.

In the example of FIG. 2, a feature selection of a feature of an application may be received, the application designed for partial execution on a server, and for partial execution on a client computer connected to the server by a network (202). For example, as described above, the feature selector 122 may be configured to receive a selection of the feature 112 at the server 104, as part of the application 110 that is designed for partial execution of the server 104 and for partial execution at the client 106. In other examples, as described in more detail, below, selection of a feature may be received with respect to a specific line of application code, e.g., in scenarios in which a user of the network location manager 102 is suitably familiar with the application code to make such a selection accurately.

A current location of application code implementing the feature may be identified as being at either the server of the client computer (204). For example, the feature analyzer 126 may be configured to determine that the selected feature 112 is located at the server 104. Although not explicitly described above in detail, it will be appreciated that, in various implementations, it may occur that one or more features selected using the feature selector 122 may contain code that is present at both the server 104 and the client 106. In such cases, of course, the application code associated with the feature and located at the server 104 will ultimately be moved to the client 106, while, conversely, application code associated with the feature and currently located at the client 106 will ultimately be relocated to the server 104.

Implementation of the feature may then be relocated from the current location to a modified location including re-assigning modified application code, obtained from the application code, between the server and the client computer (206). For example, the code relocator 130 may be configured to modify the application code associated with the feature 112, and previously identified and extracted from the entire application code of the application 110 using the feature analyzer 126 and the logic extractor 128, whereupon the code relocator 130 may proceed to transmit the modified, extracted application code for the feature 112 from, in the example, the server 104 to the client 106. Of course, as just referenced, application code with a current location of the client 106 could be moved from that current location to the modified location of the server 104.

In various implementations in which the selected feature is originally located at the server 104, the extracted application code may be modified at the server 104 before being sent to the client 106. In other implementations, modification may occur at the client 106, after transmission of the original application code. In still other applications, modification may occur at the separately-illustrated computing device 132 in FIG. 1.

It will be appreciated but the flowchart 200 of FIG. 2 is intended to represent a high-level, simplified example of operational concepts of the system 100 of FIG. 1. Of course, many different implementations of the system 100 of FIG. 1 and the flowchart 200 of FIG. 2 are contemplated.

Figure 3:
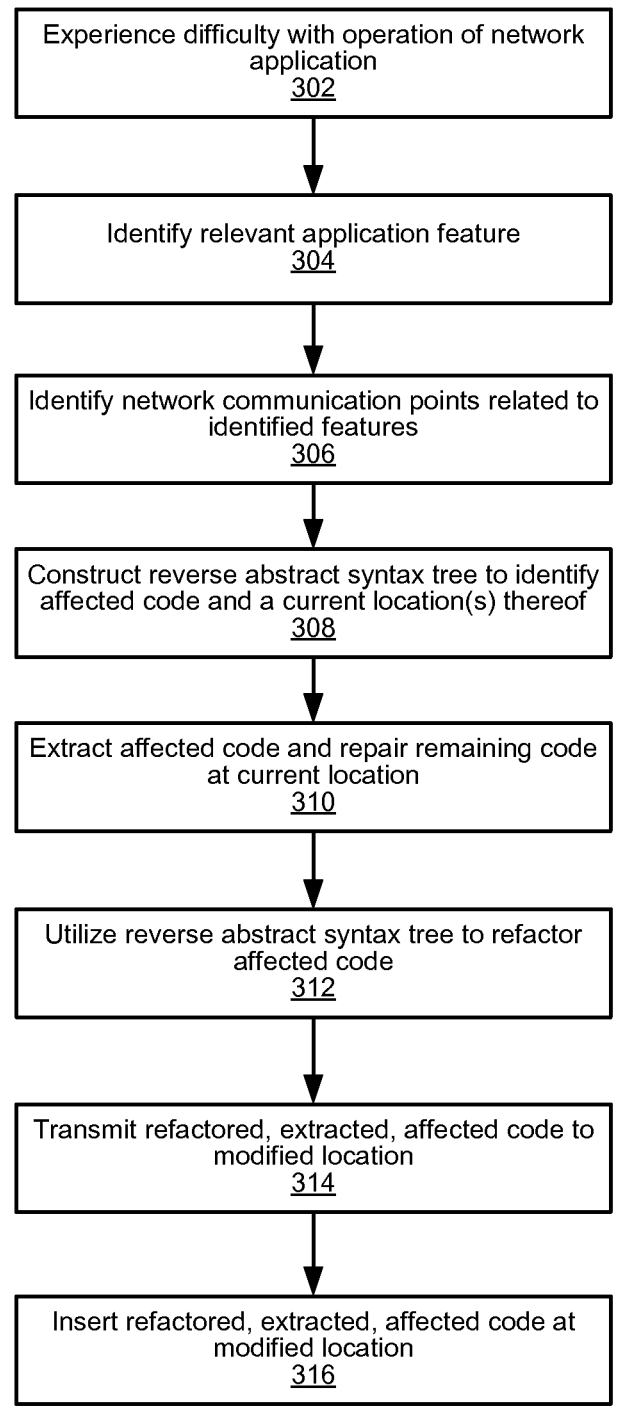
FIG. 3 is a flowchart illustrating more detailed example operations of the system of FIG. 1.

Consequently, by way of further, non-limiting example, FIG. 3 provides a flowchart 300 illustrating a more specific implementation of the system 100 of FIG. 1 and the flowchart 200 of FIG. 2. Specifically, as shown in the flowchart 300 of FIG. 3, it is assumed that a difficulty is experienced with respect to an operation of a deployed network application (such as the network application 110 (302). That is, as referenced above, during a conception/design and execution/implementation of software solutions, many decisions have to be made regarding which parts of the network application being constructed (e.g., business logic, or product logic) will be implemented in the cloud (e.g., on the server 104 or other backend computer), as compared to which portions will be executed on the client side (e.g., on the browser 116 of the client 106, or any other suitable user interface or local client application). Such decisions are often made on an ad hoc or best guess basis, and are therefore only determined to be incorrect or suboptimal when critical side effects, such as security weaknesses, or performance issues, are experienced. Thus, the difficulty experience may range anywhere from an actual malfunction to a desired change in a manner of operation of the network application 110.

Subsequently, relevant application features may be identified and selected (304). For example, the feature selector 122 may be utilized to select general or specific features of the application 110. As described, such feature selection may be performed by any suitable personnel with authorization and training to do so.

Then, a reverse dataflow analysis process may be initiated to identify network communication points related to the identified, selected features (306). For example, the feature analyzer 126 may construct an abstract syntax tree representing at least those code portions of the code of the application 110 that are associated with communications between the server 104 and the client 106. For example, for the example scenario in which the feature 112 is the selected feature for relocation, the feature analyzer 126 may determine all communication points within associated application code at which data is sent from the feature 112 to any application feature or other application aspect executing at the client 106, as well as any such communication point at which data from the client 106 is received.

The feature analyzer 126 may then construct a reverse abstract syntax tree (AST) to identify affected code associated with the selected feature, along with a current location of such affected code (e.g., at a location of either the server 104 or the client 106) (308). As referenced above, such an AST generally refers to a tree representation of a structure of the application code being modeled, in which each node of the tree represents a particular construct within the application code. As implied by the name abstract, the AST does not include all details of the code syntax, but instead, provides a representation of application code construct that is generally or completely free of the specific grammar context of the particular application code in question, so that the use of the reverse AST may be widely applicable to a large number of different types of applications.

Moreover, by constructing the AST as a reverse AST built through a reverse dataflow analysis between relevant, identified communication points between the server 104 and the client 106, the feature analyzer 126 provides a highly compact and relevant representation of the specific application code that is associated with the selected feature 112 in that is required to be relocated, in this case, from the server 104 to the client 106. Also, as referenced above and described in more detail below, the feature analyzer 126 may provide the constructed reverse AST to the code relocator 130, for use in the code refactoring processes and other operations of the code relocator 130 associated with modifying the affected code in conjunction with relocating the affected code.

The logic extractor 128 may proceed to extract the affected code identified by the feature analyzer 126 in conjunction with construction of the reverse AST, and may proceed to repair remaining code at the current location that is affected by the upcoming relocation of the affected, extracted code (310). Then, the code relocator 130 may proceed, in the example, to utilize the reverse AST to perform code refactoring of the affected code (312). Specific examples of code changes associated with such refactoring are provided below, in the context of two specific use cases illustrated and described with respect to FIGS. 4A/4B and FIGS. 5A/5B.

The code relocator 130 may then transmit the refactored, affected code to the updated or modified location (314), e.g., may transmit the modified application code associated with the feature 112 from the server 104 to the client 106. Then, in a final operation of the example of FIG. 3, the refactored, affected code may be inserted by the code relocator 130 at the modified location (316), e.g., at the client 106. As referenced above, the code relocator 130 may be responsible for making any associated changes required at the, in the example, client 106, such as modifying operations of existing local features 118, 120, if needed.

Figure 4A:
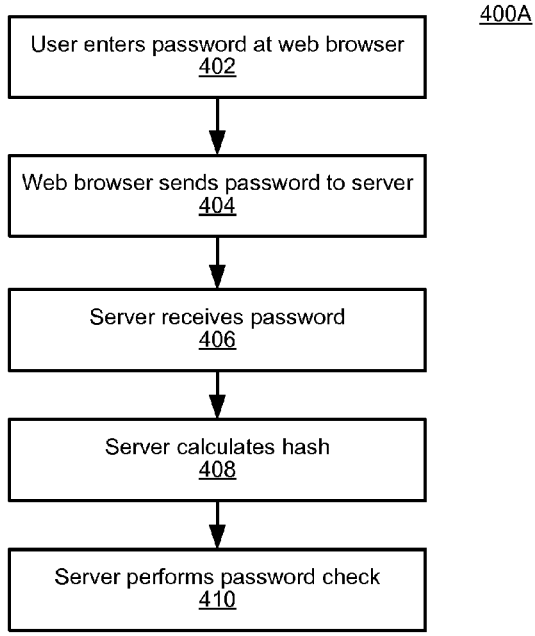
FIG. 4A is a flowchart illustrating a first use case scenario that may occur prior to an operation of the system of FIG. 1.

As referenced above, FIGS. 4A/4B provide a first use case scenario illustrating the type of code relocation described above, including the types of changes to sequences of feature-related operations as these operations are reversed to create a mirror image of the previously-existing application code operations. Specifically, FIGS. 4A/4B relate to password-related features, reflecting scenarios in which, for example, password-related features are relocated between the server 104 and the client 106 in order to provide enhanced security with respect to the use of the password in question. By way of background for purposes of the examples of FIGS. 4A/4B, it is assumed that a password will be stored using a hash algorithm, so that the resulting hash value permits verification of receipt of a correct password, without permitting actual recovery or knowledge of the password itself. In a hypothetical example, it may occur that a designer of the application 110 assumes that a secure connection exists between the server 104 and the client 106 on the network 108, and therefore decided to enable a sending of the password as plain text between the client 106 and the server 104, whereupon the hash value is calculated at the server 104.

Flowchart 400A of FIG. 4A illustrates this process, as shown. The user of the client 106 enters a password at the browser 116 (402), and the browser 116 sends the plain text password to the server 104 (404). As denoted by the double arrow connecting operation 404 and 406, this communication occurs between the client 106 and the server 104, by way of the network 108. Consequently, the server 104 receives the plain text password (406), calculates the hash value associated therewith (408) and ultimately performs a password check validating that the correct password has been received.

Figure 4B:
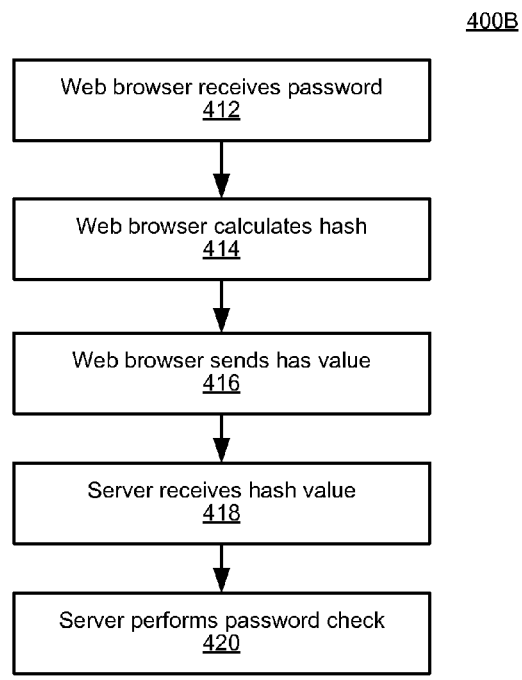
FIG. 4B is a flowchart illustrating a modification of the use case scenario of FIG. 4A, implemented using the system of FIG. 1.

If, at a later time, a user of the server 104 providing the application 110 to the client 106 determines that this password methodology is not sufficiently secure, then the network location manager 102 may be required to relocate this password-related feature from the server 104 to the client 106. Consequently, as shown in FIG. 4B, the results of associated refactoring of the affected, extracted code are illustrated in the example flowchart 400B.

As shown, the web browser 116 initially receives the plain text password (412) from the user, and, at this point the web browser 116 itself calculates the associated hash value for the password (414). The web browser 116 may then send the hash value (416), to the server 104, as represented by the double arrow connecting operations 416 and 418. In this way, the server receives the hash value (418), and performs the password check based thereon (420).

Figure 5A:
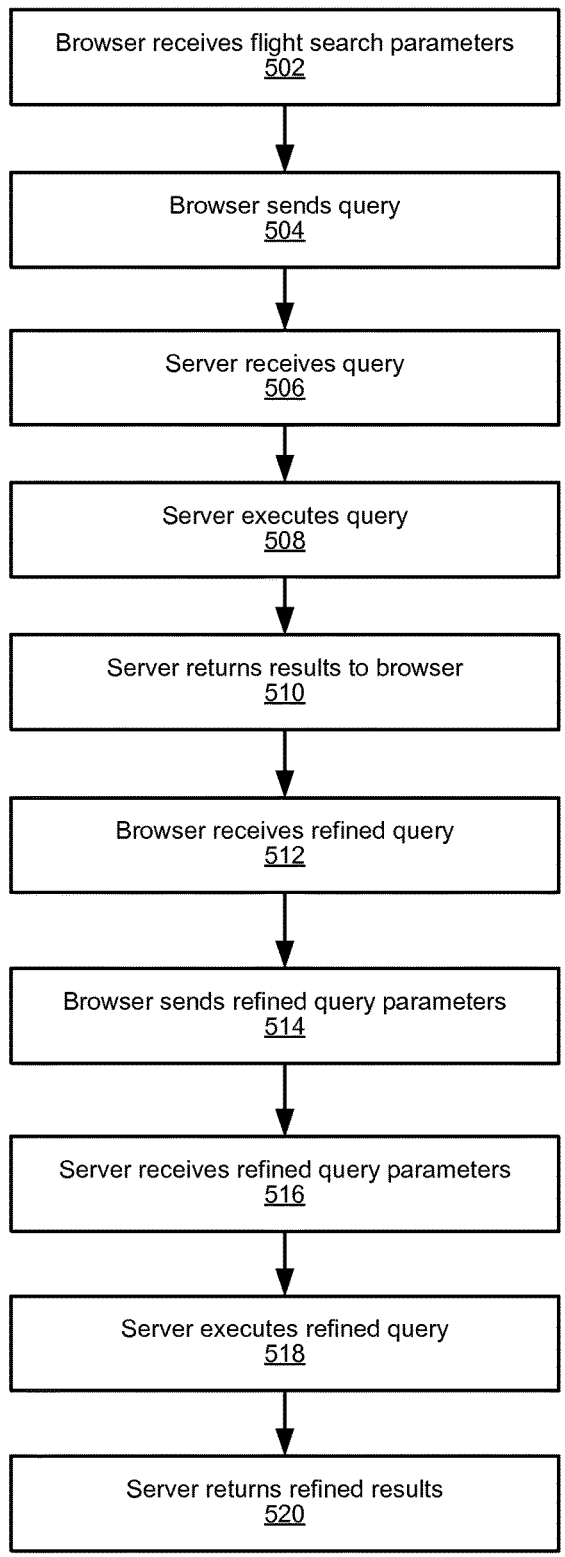
FIG. 5A is a second use case scenario that may occur prior to an operation of the system of FIG. 1.

In additional simplified example illustrated with respect to FIGS. 5A/5B, it is assumed that the application 110 is a flight search system associated with providing services related to the selection and purchase of airline tickets. In such systems, a user typically performs queries against a database of flight data, in order to locate and purchase desired airline tickets. Further in the example, it may occur that the application 110 was originally designed such that each such search request triggers a query to the server 104, e.g., such a query may be sent to the server 104 each time that a search parameter is changed at the browser 116 (e.g., each time a desired price range is submitted).

Thus, in the example of FIG. 5A, which illustrates an original operation of the application 110, before operations of the network location manager 102, the browser 116 initially receives flight search parameters (502). The browser then sends the associated query (504) to the server 104, as indicated by the double arrow between the operations 504 and 506. Consequently, the server 104 receives the query (506), executes the query (508), and returns query results to the browser 116 (510).

That is, as indicated by the double arrow between the operations 510 and 512, a communication of the query results is sent from the server 104 and received at the browser 116, whereupon the browser 116 may receive refined query parameters from the user (512). The browser 116 may thus send the received, refined query parameters (514) to the server, again as indicated by the double arrow between the operations 514 and 516. In this way, the server 104 receives the refined query parameters (516), executes the refined query (518), and returns the refined query results (520) to the browser 116.

Although operations of the flowchart 500A of FIG. 5A may be perfectly feasible or acceptable in some implementations of the application 110, depending on various factors (e.g., a corresponding load experienced at the server 104, a required speed of providing search results to the user, or other factors), it may occur at some point that the owner or the user of the server 104 providing the application 110 wishes to update the application 110, such that each query refinement may be executed at the browser 116, rather than triggering an updated query sent to the server 104.

Figure 5B:
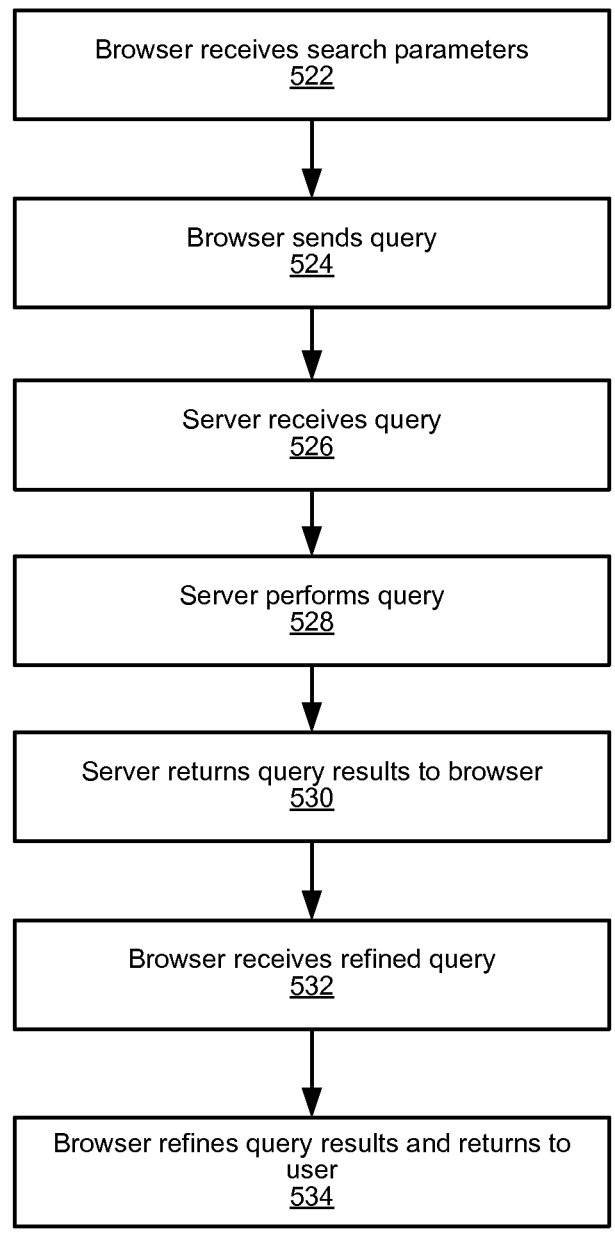
FIG. 5B is a flowchart illustrating a modification of the use case scenario of FIG. 5A, implemented using the system of FIG. 1.

As a result, in the example of FIG. 5B, the flowchart 500 illustrates that the browser 116 initially receives search parameters of a query (522), and sends the query to the server 104 (524). Again, as indicated by the double arrow between the operations 524 and 526, the server 104 receives the query over the network 108 (526), and executes the query (528). Then, the server 104 returns the query results to the browser 116 (530).

That is, again as shown by the double arrows connected the operations 530 and 532, the browser receives the query results from the server 104 over the network 108, and subsequently receives a refined query with updated query parameters from the user of the browser 116 (532). Thereafter, the browser 116 itself refines the query results, based on the updated query parameters, and returns the refined query results to the user (534).

Of course, many other use case scenarios may be implemented to benefit from the various operations of the network location manager 102 described herein. For example, although the above discussion is focused primarily on examples in which the application 110 has been designed and deployed, the network location manager 102 also may be used during design operations of the application 110, prior to, or in conjunction with, a deployment of the application 110.

In specific example implementations, the network location manager 102 may be implemented in an integrated development environment (IDE). For example, the network location manager 102 may be implemented using programming language ABAP in the eclipse integrated development environment, also referred to as ABAP development tools. Other example environments include the HANA studio and the HANA web IDE, where the term HANA refers to the well-known in-memory computing platform of SAP SE.

When using such an IDE, or in other suitable design environments, it may be possible for a code designer or other user of the network location manager 102 to select a desired feature for relocation by specifically identifying an entry point within the application code associated with providing the feature to be (potentially) relocated. For example, it may occur that the operator of the network location manager 102 may have been involved in the design of the application code, or may otherwise have sufficient knowledge thereof. In such cases, the user may, within an IDE or suitable code editor, select a particular line of code. Then, the user may be provided with an option (e.g., using a pop-up window or other suitable mechanism) to use this line as a feature entry point. The network location manager 102 (e.g., the feature analyzer 126) may then use the identified line as the entry point for feature/code analysis, which may thereafter be performed as described herein. In such scenarios, of course, the network location manager 102 will generally be reliant on an accuracy of the user in selecting the correct entry point, although other feature selection operations described herein may be used as backup or verification techniques to validate a selection of the user.

Thus, the present description provides techniques for "cloudifying" (or performing "cloudification" of) application code of cloud-based application, in which application code for specific application features is relocated from a client, such as the client 106 to a server, such as the server 104. Similarly, but conversely, the present description provides techniques for "decloudifying" (or performing "decloudification" of) application code associated with the specific application features of a cloud-based application (e.g., relocating application code from the server 104 to the client 106). In this way, vendor resources may be conserved, and application users may be provided with an optimized, secure, reliable, cost-effective, and efficient implementation of cloud-based applications.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one processor, are configured to:
receive a feature selection of a feature of an application, the application designed for partial execution on a server and for partial execution on a client computer connected to the server by a network;
identify a current location of application code implementing the feature as being at either the server or the client computer;
identify communication points associated with the application code at which client-server interactions occur;
extract the application code, based on the communication points; and
relocate implementation of the feature from the current location to a modified location including re-assigning modified application code, obtained from the extracted application code, between the server and the client computer,
wherein server-client interactions within the modified application code are reversed as compared with the extracted application code.

2. The computer program product of claim 1, wherein the instructions, when executed, are further configured to cause the at least one processor to:
provide a feature selection graphical user interface (GUI) including a plurality of selectable application features; and
receive the feature selection from the feature selection GUI.

3. The computer program product of claim 1, wherein the instructions, when executed, are further configured to cause the at least one processor to:
identify the application code from within an entire application code of the application for extraction therefrom, based on the communication points.

4. The computer program product of claim 3, wherein the instructions, when executed, are further configured to cause the at least one processor to:
generate a reverse abstract syntax tree (AST) representing at least the application code and based on the communication points.

5. The computer program product of claim 1, wherein the instructions, when executed, are further configured to cause the at least one processor to:
analyze the application code including identifying start and end points thereof within an entire application code of the application.

6. The computer program product of claim 5, wherein the instructions, when executed, are further configured to cause the at least one processor to:
  extracting the application code, based on the identified start and end points.

7. The computer program product of claim 1, wherein the instructions, when executed, are further configured to cause the at least one processor to:
  modify the application code to obtain the modified application code, including refactoring the application code.

8. The computer program product of claim 7, wherein the instructions, when executed, are further configured to cause the at least one processor to:
  refactor the application code based on a reverse abstract syntax tree (AST) formed based on the application code.

9. A computer-implemented method for executing instructions stored on a non-transitory computer readable storage medium, the method comprising:
  receiving a feature selection of a feature of an application, the application designed for partial execution on a server and for partial execution on a client computer connected to the server by a network;
  identifying a current location of application code implementing the feature as being at either the server or the client computer;
  identifying communication points of the application code, from within an entire application code of the application, at which client-server interactions occur;
  extracting the application code, based on the communication points;
  modifying the application code to obtain modified application code; and
  relocating implementation of the feature from the current location to a modified location including re-assigning the modified application code between the server and the client computer, and reversing server-client interactions of the application code within the modified application code, as compared with the extracted application code.

10. The method of claim 9, wherein modifying the application code to obtain modified application code comprises:
  refactoring the application code to obtain the modified application code.

11. The method of claim 9, wherein modifying the refactoring the application code to obtain the modified application code comprises:
  refactoring the application code based on a reverse abstract syntax tree (AST) formed based on the application code.

12. A system comprising:
  a non-transitory computer-readable storage medium storing instructions recorded thereon; and
  at least one processor operable to execute the stored instructions, the system including
  a feature selector configured to cause the at least one processor to receive a feature selection of a feature of an application, the application designed for partial execution on a server and for partial execution on a client computer connected to the server by a network;
  a feature analyzer configured to cause the at least one processor to identify a current location of application code implementing the feature as being at either the server or the client computer, and identify the application code from within an entire application code of the application;
  a logic extractor configured to extract the application code from the entire application code; and
  a code relocator configured to modify the extracted application code to obtain modified application code in which server-client interactions are reversed as compared to in the extracted application code, and relocate implementation of the feature including re-assigning the modified application code between the server and the client computer.

13. The system of claim 12, wherein the feature selector is further configured to cause the at least one processor to:
  provide a feature selection graphical user interface (GUI) including a plurality of selectable application features; and
  receive the feature selection from the feature selection GUI.

14. The system of claim 12, wherein the feature analyzer is further configured to cause the at least one processor to:
  identify communication points of the application code, from within the entire application code of the application, at which client-server interactions occur.

15. The system of claim 12, wherein the feature analyzer is further configured to cause the at least one processor to analyze the application code including identifying start and end points thereof within the entire application code of the application.

16. The system of claim 15, wherein the logic extractor is further configured to cause the at least one processor to extract the application code, based on the identified start and end points.

17. The system of claim 12, wherein the code relocator is further configured to cause the at least one processor to refactor the application code to modify the application code and thereby obtain the modified application code.

18. The system of claim 17, wherein the code relocator is further configured to cause the at least one processor to refactor the application code based on a reverse abstract syntax tree (AST) formed based on the application code.

* * * * *